United States Patent
Li et al.

(10) Patent No.: US 10,467,452 B2
(45) Date of Patent: Nov. 5, 2019

(54) FINGERPRINT IDENTIFICATION DISPLAY PANEL AND DISPLAY DEVICE

(71) Applicant: BOE TECHNOLOGY GROUP CO., LTD., Beijing (CN)

(72) Inventors: Changfeng Li, Beijing (CN); Haisheng Wang, Beijing (CN); Yingming Liu, Beijing (CN); Rui Xu, Beijing (CN); Pengpeng Wang, Beijing (CN); Pengcheng Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 14 days.

(21) Appl. No.: 15/742,102

(22) PCT Filed: Jun. 29, 2017

(86) PCT No.: PCT/CN2017/090744
§ 371 (c)(1),
(2) Date: Jan. 5, 2018

(87) PCT Pub. No.: WO2018/028330
PCT Pub. Date: Feb. 15, 2018

(65) Prior Publication Data
US 2019/0114457 A1    Apr. 18, 2019

(30) Foreign Application Priority Data

Aug. 8, 2016   (CN) .......................... 2016 1 0643393

(51) Int. Cl.
*G06K 9/00* (2006.01)
*G02F 1/1333* (2006.01)
(Continued)

(52) U.S. Cl.
CPC ......... *G06K 9/0004* (2013.01); *G02F 1/1343* (2013.01); *G02F 1/13318* (2013.01);
(Continued)

(58) Field of Classification Search
CPC .............. G06K 9/0004; G02F 1/13338; G02F 1/133512; G02F 1/133528; G02F 1/1343
See application file for complete search history.

(56) References Cited

U.S. PATENT DOCUMENTS

| 6,147,738 A * | 11/2000 | Okamoto .......... G02F 1/133528 349/122 |
| 2004/0165125 A1* | 8/2004 | Saida ................ G02F 1/133528 349/96 |

(Continued)

FOREIGN PATENT DOCUMENTS

| CN | 101299102 A | 11/2008 |
| CN | 102859693 A | 1/2013 |

(Continued)

OTHER PUBLICATIONS

Search Report for International Patent Application No. PCT/CN2017/090744 dated Oct. 9, 2017.

*Primary Examiner* — Utpal D Shah
(74) *Attorney, Agent, or Firm* — Calfee, Halter & Griswold LLP

(57) ABSTRACT

A fingerprint identification display panel and a display device are disclosed. For the liquid crystal layer at the position corresponding to the first opening area corresponding to the photosensitive sensing unit in the light shielding layer, the initial direction of the long axis of the liquid crystal molecules is set to form an angle of 45 degrees with the transmission axis direction of the upper polarizer, and the liquid crystal layer at the position corresponding to the first opening area is controlled to form an equivalent quarter-wave plate.

20 Claims, 3 Drawing Sheets

(51) Int. Cl.
  *G02F 1/1335* (2006.01)
  *G02F 1/1343* (2006.01)
  *G02F 1/133* (2006.01)
(52) U.S. Cl.
  CPC .... *G02F 1/13338* (2013.01); *G02F 1/133512* (2013.01); *G02F 1/133528* (2013.01); *G06K 9/00* (2013.01); *G02F 2001/133388* (2013.01)

(56) References Cited

U.S. PATENT DOCUMENTS

| | | | | |
|---|---|---|---|---|
| 2007/0002231 | A1* | 1/2007 | Lee | G02F 1/133528 349/117 |
| 2009/0283772 | A1 | 11/2009 | Cho et al. | |
| 2009/0284703 | A1* | 11/2009 | Shoraku | G02F 1/133753 349/129 |
| 2010/0085514 | A1* | 4/2010 | Tsuchiya | G02F 1/133528 349/96 |
| 2011/0069038 | A1 | 3/2011 | Fann et al. | |
| 2012/0182512 | A1* | 7/2012 | Sakurai | G02F 1/133528 349/141 |
| 2013/0037815 | A1 | 2/2013 | Okajima et al. | |
| 2015/0036092 | A1* | 2/2015 | Miyake | G02F 1/133753 349/144 |
| 2016/0246085 | A1* | 8/2016 | Zhong | G02F 1/1334 |
| 2017/0316248 | A1* | 11/2017 | He | G06K 9/00006 |
| 2018/0005005 | A1* | 1/2018 | He | G06F 3/0412 |
| 2018/0113359 | A1* | 4/2018 | Lee | G02F 1/133345 |

FOREIGN PATENT DOCUMENTS

| | | |
|---|---|---|
| CN | 103092428 A | 5/2013 |
| CN | 106067018 A | 11/2016 |
| CN | 206058225 U | 3/2017 |

\* cited by examiner

FINGERPRINT IDENTIFICATION DISPLAY PANEL AND DISPLAY DEVICE

RELATED APPLICATIONS

The present application is the U.S. national phase entry of the international application PCT/CN2017/090744, with an international filing date of Jun. 29, 2017, which claims the benefit of Chinese Patent Application No. 201610643393.7, filed on Aug. 8, 2016, the entire disclosures of which are incorporated herein by reference.

TECHNICAL FIELD

The disclosure relates to the field of display technology, in particular to a fingerprint identification display panel and a display device.

BACKGROUND

With the rapid development of display technology, the display panel with fingerprint identification function has gradually been widespread in people's life. At present, the fingerprint identification display panel generally adopts a capacitive structure to realize the function of identifying a fingerprint. For example, the in-cell fingerprint identification display panel is provided with a capacitive fingerprint identification component inside the display panel, which is advantageous for the display panel to be lighter and thinner. However, the capacitive fingerprint identification component is apt to generate parasitic capacitance with the components inside the display panel, resulting in interference between the fingerprint identification detection signal and the display signal, thereby affecting the quality of the fingerprint identification.

Therefore, in order to avoid the above problem, the photosensitive characteristics of e.g. the PIN junction can be utilized, and the photosensitive sensing units can be integrated inside the display panel to achieve high-quality fingerprint identification. In addition, in order not to affect the aperture ratio of the display panel, the photosensitive sensing units for realizing fingerprint identification need to be placed in the region where the black matrix is located. Besides, according to the photosensitive characteristics of the photosensitive sensing units, it is necessary to open the corresponding positions of the black matrix to expose the photosensitive sensing units for sensing the light reflected by the fingers. As shown in FIG. 1, there are some reflective layers (for example, the lower metal electrode of the PIN junction) below the photosensitive sensing units. When the photosensitive sensing units are disposed on the array substrate, after the external light is incident on the photosensitive sensing unit through the opening area of the black matrix BM and reflected by the reflective layers, light leakage of the display panel may be caused, resulting in poor display.

SUMMARY

To this end, the embodiments of the disclosure provide a fingerprint identification display panel and a display device, which can solve the problem of light leakage caused by the opening area of the light shielding layer in the present display panel with integrated photosensitive sensing units.

Therefore, the embodiments of the disclosure provide a fingerprint identification display panel. The fingerprint identification display panel includes: an array substrate and an counter substrate disposed opposite to each other, an upper polarizer disposed on a side of the counter substrate facing away from the array substrate, a liquid crystal layer between the array substrate and the counter substrate, a plurality of photosensitive sensing units arranged in an array disposed on a side of the array substrate facing the counter substrate, and a light shielding layer disposed on a side of the counter substrate facing away from the array substrate or on a side of the counter substrate facing the array substrate. The light shielding layer is provided with a first opening area at a position corresponding to a photosensitive sensing unit and a second opening area at a position corresponding to a pixel display area. In the liquid crystal layer at a position corresponding to the first opening area, an initial direction of a long axis of liquid crystal molecules forms an angle of 45 degrees with a transmission axis direction of the upper polarizer; and the liquid crystal layer at a position corresponding the first opening area is an equivalent quarter-wave plate.

In a possible implementation, in the above fingerprint identification display panel provided by the embodiments of the disclosure, a thickness of the liquid crystal layer at the position corresponding to the first opening area satisfies the following formula: $(n_e - n_o) d = \frac{1}{4}\lambda + n\lambda$; where $n_e$ is a refractive index of the liquid crystal molecules for e-light with a polarization direction parallel to the optical axis of the liquid crystal molecules, $n_o$ is the refractive index of the liquid crystal molecules for o-light with a polarization direction perpendicular to the optical axis of the liquid crystal molecules, d is the thickness of the liquid crystal layer at the position corresponding to the first opening area, n is a positive integer, and $\lambda$ is a wavelength of light passing through the liquid crystal layer at the position corresponding to the first opening area.

In a possible implementation, in the above fingerprint identification display panel provided by the embodiments of the disclosure, the sum of the thickness of the photosensitive sensing unit and the thickness of the liquid crystal layer at the position corresponding to the first opening area is equal to the thickness of the liquid crystal layer at the position corresponding to the second opening area.

In a possible implementation, in the above fingerprint identification display panel provided by the embodiments of the disclosure, the fingerprint identification display panel further includes: a thickness adjustment layer located at the first opening area; the thickness adjustment layer is disposed between the photosensitive sensing unit and the array substrate, and/or disposed on a side of the photosensitive sensing unit facing the liquid crystal layer, and/or disposed on a side of the counter substrate facing the liquid crystal layer; and the sum of the thickness of the photosensitive sensing unit, the thickness of the thickness adjustment layer and the thickness of the liquid crystal layer at the position corresponding to the first opening area is equal to the thickness of the liquid crystal layer at the position corresponding to the second opening area.

In a possible implementation, in the above fingerprint identification display panel provided by the embodiments of the disclosure, the thickness adjustment layer is a resin layer.

In a possible implementation, in the above fingerprint identification display panel provided by the embodiments of the disclosure, the deflection state of liquid crystal molecules of the liquid crystal layer at the position corresponding to the first opening area satisfies the following formula: $(n_{eff} - n_o) d = \frac{1}{4}\lambda + n\lambda$; where $n_{eff}$ is a refractive index of the deflected liquid crystal molecules for e-light with a polarization direction parallel to an optical axis of the deflected liquid crystal molecules, $n_o$ is a refractive index of the deflected liquid crystal molecules for o-light with a polarization direction perpendicular to the optical axis of the deflected liquid crystal molecules, d is the thickness of the liquid crystal layer at the position corresponding to the first opening area, n is a positive integer, and λ is the wavelength of light passing through the liquid crystal layer at the position corresponding to the first opening area.

In a possible implementation, in the above fingerprint identification display panel provided by the embodiments of the disclosure, the fingerprint identification display panel further includes: an electrode structure disposed at the first opening area for adjusting the deflection state of the liquid crystal molecules.

In a possible implementation, in the above fingerprint identification display panel provided by the embodiments of the disclosure, the electrode structure further includes: an upper electrode disposed on a side of the counter substrate facing the liquid crystal layer and a lower electrode disposed on a side of the array substrate facing the liquid crystal layer.

In a possible implementation, in the above fingerprint identification display panel provided by the embodiments of the disclosure, the lower electrode is a fixed potential electrode connected with a photodiode in the photosensitive sensing unit.

The embodiments of the disclosure further provide a display device, the display device includes the above fingerprint identification display panel provided by the embodiments of the disclosure.

A fingerprint identification display panel and a display device provided by the embodiments of the disclosure, for the liquid crystal layer at the position corresponding to the first opening area corresponding to the photosensitive sensing unit in the light shielding layer, the initial direction of the long axis of the liquid crystal molecules is set to form an angle of 45 degrees with the transmission axis direction of the upper polarizer, and the liquid crystal layer at the position corresponding to the first opening area is controlled to form an equivalent quarter-wave plate. The linearly polarized light entering from the upper polarizer is converted into circularly polarized light after passing through the equivalent quarter-wave plate. After reflected by the reflective layer below the photosensitive sensing unit, the rotation state of the circularly polarized light is changed. The circularly polarized light is converted into linearly polarized light after passing through the equivalent quarter-wave plate again, and the polarization direction of the linearly polarized light is perpendicular to the transmission axis direction of the upper polarizer and therefore the linearly polarized light cannot exit through the upper polarizer, thereby achieving the effect of preventing light leakage.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE EMBODIMENT

Figure 1:
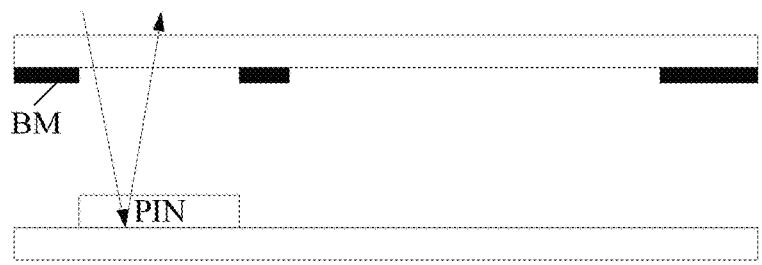
FIG. 1 is a structural schematic diagram of a display panel provided with a photosensitive sensing unit in the prior art.

The specific implementations of the fingerprint identification display panel and the display device provided in the embodiments of the disclosure are described in detail below with reference to the drawings.

The shape and size of the components in the drawings do not reflect the real scale of the fingerprint identification display panel, and are only schematically illustrate the disclosure.

Figure 2:
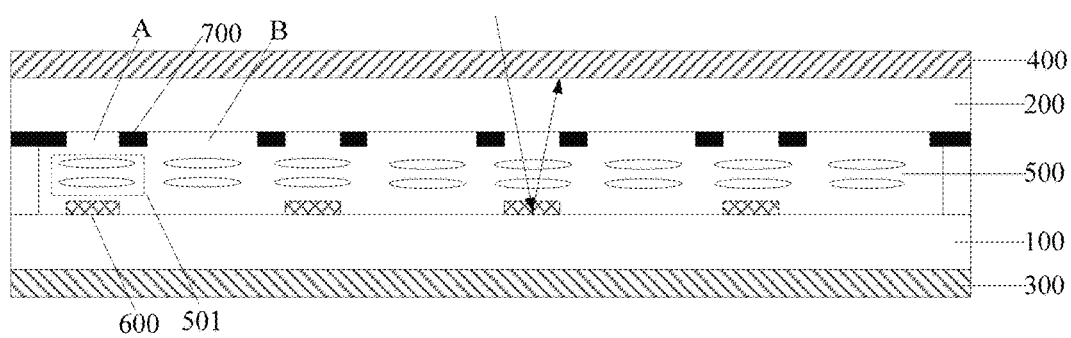
FIG. 2 is a structural schematic diagram of a fingerprint identification display panel provided by an embodiment of the disclosure.

The embodiments of the disclosure provide a fingerprint identification display panel. As shown in FIG. 2, the fingerprint identification display panel includes: an array substrate 100 and an counter substrate 200 disposed opposite to each other, an upper polarizer 400 disposed on a side of the counter substrate 200 facing away from the array substrate 100, a liquid crystal layer 500 between the array substrate 100 and the counter substrate 100, a plurality of photosensitive sensing units 600 arranged in an array disposed on a side of the array substrate 100 facing the counter substrate 200, and a light shielding layer 700 disposed on a side of the counter substrate 200 facing away from the array substrate 100 or on a side of the counter substrate 200 facing the array substrate 100. The light shielding layer is provided with a first opening area A at a position corresponding to a photosensitive sensing unit 600 and a second opening area B at a position corresponding to a pixel display area. In FIG. 2, the light shielding layer 700 is disposed on the counter substrate 200 as an example. If the light shielding layer is disposed on a side of the counter substrate 200 facing away from the array substrate 100, the light shielding layer can be disposed between the counter substrate 200 and the upper polarizer 400, and optical adhesive can be disposed in the first opening area and the second opening area.

In the liquid crystal layer 500 at the position corresponding to the first opening area A, the initial direction of the long axis of liquid crystal molecules forms an angle of 45 degrees with the transmission axis direction of the upper polarizer 400. The liquid crystal layer 500 at the position corresponding the first opening area A is an equivalent quarter-wave plate 501.

It should be noted that the light shielding layer 700 in the above fingerprint identification display panel provided by the embodiments of the disclosure is generally implemented by using a black matrix layer. In addition, as shown in FIG. 2, the fingerprint identification display panel provided by the embodiments of the disclosure can generally further include a lower polarizer 300 disposed on a side of the array substrate 100 facing away from the counter substrate 200. Of course, the lower polarizer 300 may not be provided, and the backlight module providing polarized light may be directly used, which is not described in detail herein.

Figure 3:
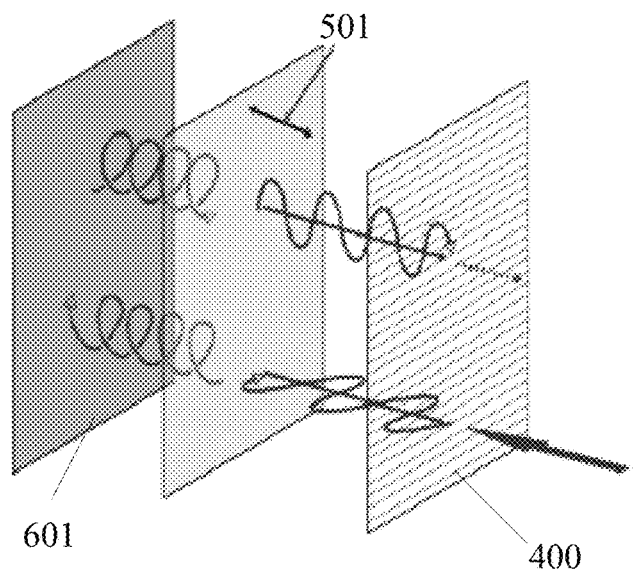
FIG. 3 is a principle diagram of optical characteristics change in a fingerprint identification display panel provided by an embodiment of the disclosure.

In the above fingerprint identification display panel provided by the embodiments of the disclosure, in the liquid crystal layer 500 at the position corresponding to the first opening area A, an angle of 45 degrees is formed between the initial direction of the long axis of the liquid crystal molecules and the transmission axis direction of the upper polarizer 400. Therefore, as shown in FIG. 3, after the ambient light passing through the upper polarizer 400, an angle of 45 degrees is formed between the generated linearly polarized light and the optical axis of the equivalent quarter-wave plate 501, this linearly polarized light can be decomposed into e-light with a polarization direction parallel to the optical axis of the equivalent quarter-wave plate and o-light with a polarization direction perpendicular to the optical axis of the equivalent quarter-wave plate. Due to the difference between the refractive index $n_e$ in the direction of the optical axis and the refractive index $n_o$ in the direction perpendicular to the optical axis of the equivalent quarter-wave plate 501, the propagation velocities of the e-light and the o-light in the equivalent quarter-wave plate 501 are different. When the thickness of equivalent quarter-wave plate 501 is exactly $(n+¼) \lambda$ of the incident light, the linearly polarized light can be converted into circularly polarized light after passing through the equivalent quarter-wave plate 501. After reflected by the reflective layer 601 below the photosensitive sensing unit 600, the rotation state of the circularly polarized light changes. After passing through the equivalent quarter-wave plate 501 again, linearly polarized light is generated again and the polarization direction of the linearly polarized light is perpendicular to the direction of the transmission axis direction of the upper polarizer 400 due to the action of the quarter-wave plate, therefore it cannot exit through the upper polarizer 400 (as shown by the arrow in FIG. 2), thereby achieving the effect of preventing light leakage.

According to the above analysis, in the above fingerprint identification display panel provided by the embodiments of the disclosure, an equivalent quarter-wave plate 501 should be disposed between the upper polarizer 400 and the reflective layer 601 below the photosensitive sensing unit 600, and the thickness d of the equivalent quarter-wave plate 501 should satisfy the formula $(n_e-n_o)d=¼\lambda+n\lambda$. The wavelength range of visible light is about 380-780 nm, and n is a positive integer. The thickness d of the equivalent quarter-wave plate 501 calculated by the formula may be very small, so it is very difficult to use the conventional quarter-wave plate limited by the manufacturing process. Therefore, in the above fingerprint identification display panel provided by the embodiments of the disclosure, the liquid crystal layer 500 at the position corresponding to the first opening area A forms an equivalent quarter-wave plate 501, and it is easy to realize the thickness adjustment of the equivalent quarter-wave plate 501.

In a specific implementation, in order to ensure that in the liquid crystal layer 500 at the position corresponding to the first opening area A, an angle of 45 degrees is formed between the initial direction of the long axis of the liquid crystal molecules and the transmission axis direction of the upper polarizer 400, in the manufacturing process of the above fingerprint identification display panel in the embodiments provided by the disclosure, after alignment process for the alignment layers (PI) on the array substrate and the counter substrate is performed by rubbing the surfaces of the alignment layers, the alignment layers (PI) on the array substrate and the counter substrate corresponding to the first opening area A are aligned separately by laser rubbing to ensure that after the ambient light enters from the first opening area A and passes through the upper polarizer 400, the polarization direction of the converted linearly polarized light has a specific angle of 45 degrees with respect to the optical axis of the equivalent quarter-wave plate 501.

Specifically, in order to form the equivalent quarter-wave plate 501 in the liquid crystal layer 500 at the position corresponding to the first opening area A and meet the above requirements, in the above fingerprint identification display panel provided by the embodiments of the disclosure, the following two modes can be used.

The first mode: in a specific implementation, in the above fingerprint identification display panel provided by the embodiments of the disclosure, the thickness of the liquid crystal layer 500 at the position corresponding to the first opening area A can be controlled to satisfy the following formula: $(n_e-n_o) d=¼\lambda+n\lambda$; where $n_e$ is the refractive index of the liquid crystal molecules for e-light with a polarization direction parallel to the optical axis of the liquid crystal molecules, $n_o$ is the refractive index of the liquid crystal molecules for o-light with a polarization direction is perpendicular to the optical axis of the liquid crystal molecules, d is the thickness of the liquid crystal layer at the position corresponding to the first opening area A, n is a positive integer, $\lambda$ is the wavelength of the light passing through the liquid crystal layer at the position corresponding to the first opening area A, and a wavelength of yellow light (about 500 nm) is generally selected as the standard value of the wavelength.

Specifically, in order to make the thickness of the liquid crystal layer 500 at the position corresponding to the first opening area A satisfy the above conditions, in a specific implementation, the effect of controlling the thickness of the liquid crystal layer 500 on the photosensitive sensing unit 600 can be achieved by adjusting the thickness of the photosensitive sensing unit 600. Specifically, the sum of the thickness of the photosensitive sensing unit 600 and the thickness of the liquid crystal layer 500 at the position corresponding to the first opening area A is equal to the thickness of the liquid crystal layer 500 at the position corresponding to the second opening area B.

Figure 4A:
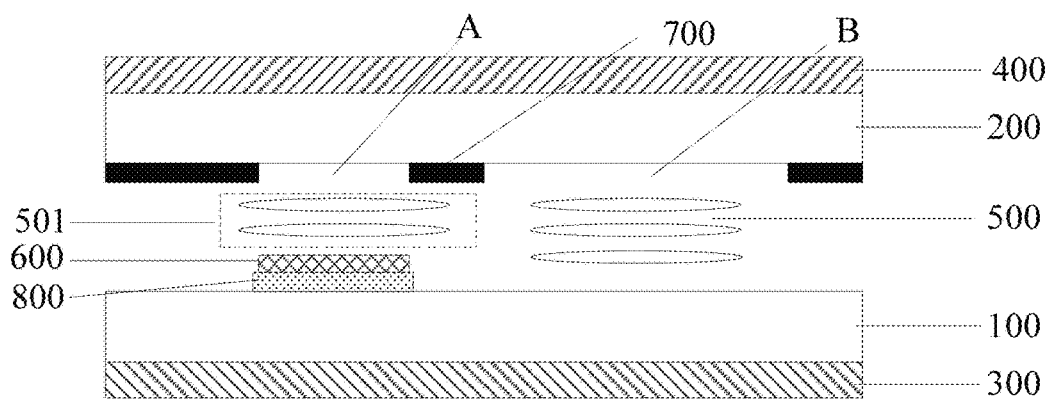
FIGS. 4a-4c are structural schematic diagrams of a first mode of a fingerprint identification display panel provided by embodiments of the disclosure respectively.
Figure 4B:
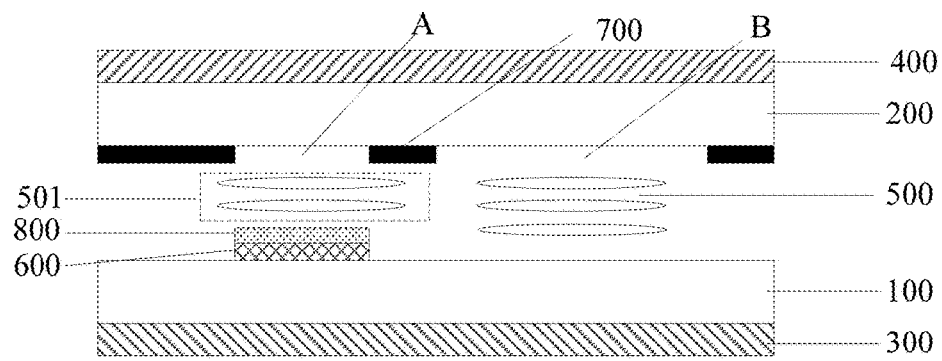
Figure 4C:
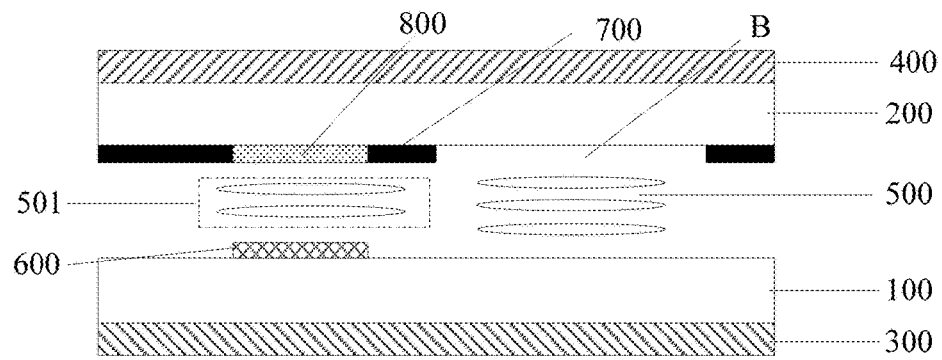

Alternatively, in a specific implementation, as shown in FIG. 4a to FIG. 4c, the effect of controlling the thickness of the liquid crystal layer 500 at the first opening area A can also be achieved by adding a thickness adjustment layer 800 at the first opening area A in the fingerprint identification display panel. Specifically, as shown in FIG. 4a, the thickness adjustment layer 800 can be disposed between the photosensitive sensing unit 600 and the array substrate 100. Alternatively, as shown in FIG. 4b, the thickness adjustment layer 800 can also be disposed on a side of the photosensitive sensing unit 600 facing the liquid crystal layer 500. Alternatively, as shown in FIG. 4c, the thickness adjustment layer 800 can also be disposed on a side of the counter substrate 200 facing the liquid crystal layer 500. Of course, the thickness adjustment layer 800 can also be disposed at these three positions or any two positions in FIG. 4 to FIG. 4c simultaneously, which is not limited herein. In addition, the thickness of the thickness adjustment layer 800 should satisfy the condition that the sum of the thickness of the photosensitive sensing unit 600, the thickness of the thickness adjustment layer 800 and the thickness of the liquid crystal layer 500 at the position corresponding to the first opening area A is equal to the thickness of the liquid crystal layer 500 at the position corresponding to the second opening area B.

In certain exemplary embodiments, the thickness adjustment layer is optionally disposed between the photosensitive sensing unit 600 and the array substrate 100 so that the thickness adjustment layer 800 does not affect the photosensitive sensing unit 600 sensing the light reflected by fingers.

In a specific implementation, in the fingerprint identification display panel provided in the embodiments of the disclosure, the thickness adjustment layer 800 is generally made of a resin layer.

The second mode: in a specific implementation, in the above fingerprint identification display panel provided by the embodiments of the disclosure, the deflection state of liquid crystal molecules of the liquid crystal layer 500 at the position corresponding to the first opening area A can be controlled to satisfy the following formula: $(n_{eff}-n_o) d = \frac{1}{4}\lambda + n\lambda$; where $n_{eff}$ is the refractive index of the deflected liquid crystal molecules for e-light with a polarization direction parallel to the optical axis of the deflected liquid crystal molecules, $n_o$ is the refractive index of the deflected liquid crystal molecules for o-light with a polarization direction perpendicular to the optical axis of the deflected liquid crystal molecules, d is the thickness of the liquid crystal layer 500 at the position corresponding to the first opening area A, n is a positive integer, $\lambda$ is the wavelength of the light passing through the liquid crystal layer 500 at the position corresponding to the first opening area A, and a wavelength of yellow light (about 500 nm) is generally selected as the standard value of the wavelength.

Specifically, in order to make the deflection state of liquid crystal molecules in the liquid crystal layer 500 at the position corresponding to the first opening area A satisfy the above conditions, in a specific implementation, the effect of controlling the deflection state of liquid crystal molecules in the liquid crystal layer 500 above the photosensitive sensing unit 600 can be achieved by adjusting an electric field applied on the liquid crystal layer 500 at the position corresponding to the first opening area A.

Figure 5:
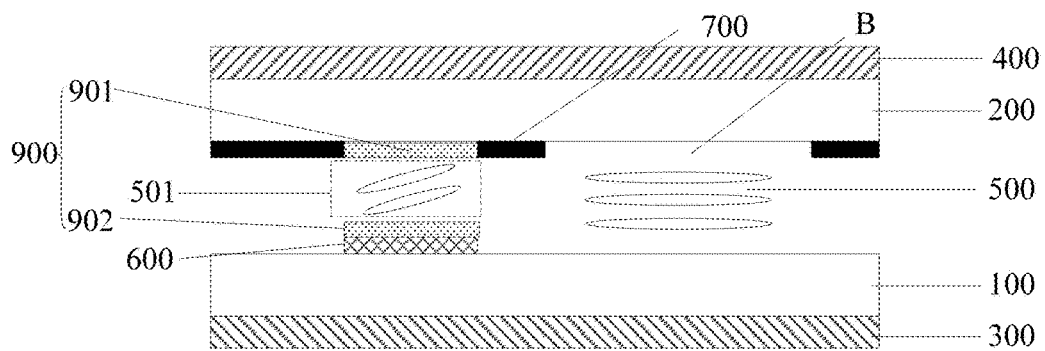
FIG. 5 is a structural schematic diagram of a second mode of a fingerprint identification display panel provided by an embodiment of the disclosure.

Based on this, in a specific implementation, in the above fingerprint identification display panel provided by the embodiments of the disclosure, as shown in FIG. 5, the fingerprint identification display panel can further include an electrode structure 900 disposed at the first opening area A for adjusting the deflection state of the liquid crystal molecules.

Specifically, the implementation of the electrode structure 900 in the above fingerprint identification display panel provided by the embodiments of the disclosure can be various. For example, as shown in FIG. 5, the electrode structure can include: an upper electrode 901 disposed on a side of the counter substrate 200 facing the liquid crystal layer 500 and a lower electrode 902 disposed on a side of the array substrate 100 facing the liquid crystal layer 500. By adjusting the voltage difference applied by the upper electrode 901 and the lower electrode 902, the deflection state of the liquid crystal molecules can be controlled, and the liquid crystal molecules are deflected to a specific angle, so as to meet the requirement for the refractive index of e-light with the polarization direction parallel to the optical axis.

In certain exemplary embodiments, in the above fingerprint identification display panel, a fixed potential electrode connected with the photodiode in the photosensitive sensing unit 600 can be multiplexed as the lower electrode 902. In this way, the function of the electrode structure 900 can be realized by only adding the upper electrode 901.

Compared with the first mode, the advantage of the above-mentioned second mode provided by the embodiments of the disclosure for satisfying the requirement that the liquid crystal layer 500 at the position corresponding to the first opening area A forms the equivalent quarter-wave plate 501 is: when the thickness of the liquid crystal cell is constant, the liquid crystal molecules can be deflected to a specific angle by adjusting the voltage difference of the electrode structure 900, so as to achieve the effect of preventing light leakage, and the operation and manufacture are more convenient.

Based on the same inventive concept, the embodiments of the disclosure further provide a display device including the above fingerprint identification display panel provided by the embodiments of the disclosure. The display device can be any product or component with display function, such as mobile phone, tablet computer, TV, display, notebook computer, digital photo frame and navigator. The implementation of the display device can refer to the embodiments of the above mentioned fingerprint identification display panel, which will not be repeated herein.

In the fingerprint identification display panel and the display device provided by the embodiments of the disclosure, for the liquid crystal layer at the position corresponding to the first opening area corresponding to the photosensitive sensing unit in the light shielding layer, the initial direction of the long axis of the liquid crystal molecules is set to form an angle of 45 degrees with the transmission axis direction of the upper polarizer, and the liquid crystal layer at the position corresponding to the first opening area is controlled to form an equivalent quarter-wave plate. The linearly polarized light entering from the upper polarizer is converted into circularly polarized light after passing through the equivalent quarter-wave plate. After reflected by the reflective layer below the photosensitive sensing unit, the rotation state of the circularly polarized light is changed. The circularly polarized light is converted into linearly polarized light after passing through the equivalent quarter-wave plate again, and the polarization direction of the linearly polarized light is perpendicular to the transmission axis direction of the upper polarizer and therefore the linearly polarized light cannot exit through the upper polarizer, thereby achieving the effect of preventing light leakage.

Apparently, the person skilled in the art may make various alterations and variations to the disclosure without departing the spirit and scope of the disclosure. As such, provided that these modifications and variations of the disclosure pertain to the scope of the claims of the disclosure and their equivalents, the disclosure is intended to embrace these alterations and variations.

What is claimed is:

1. A fingerprint identification display panel, comprising: an array substrate and an counter substrate disposed opposite to each other, an upper polarizer disposed on a side of the counter substrate facing away from the array substrate, a liquid crystal layer between the array substrate and the counter substrate, a plurality of photosensitive sensing units arranged in an array disposed on a side of the array substrate facing the counter substrate, and a light shielding layer disposed on a side of the counter substrate facing away from the array substrate or on a side of the counter substrate facing the array substrate; wherein the light shielding layer is provided with a first opening area at a position corresponding to a photosensitive sensing unit and a second opening area at a position corresponding to a pixel display area;

wherein in the liquid crystal layer at the position corresponding to the first opening area, an initial direction of a long axis of liquid crystal molecules forms an angle of 45 degrees with a transmission axis direction of the upper polarizer; and wherein the liquid crystal layer at the position corresponding the first opening area is an equivalent quarter-wave plate.

2. The fingerprint identification display panel according to claim 1, wherein a thickness of the liquid crystal layer at the position corresponding to the first opening area satisfies the following formula:

$$(n_e-n_o)d=\tfrac{1}{4}\lambda+n\lambda;$$

wherein $n_e$ is a refractive index of the liquid crystal molecules for e-light with a polarization direction parallel to an optical axis of the liquid crystal molecules, $n_o$ is a refractive index of the liquid crystal molecules for o-light with a polarization direction perpendicular to the optical axis of the liquid crystal molecules, d is a thickness of the liquid crystal layer at the position corresponding to the first opening area, n is a positive integer, and λ is a wavelength of light passing through the liquid crystal layer at the position corresponding to the first opening area.

3. The fingerprint identification display panel according to claim 2, wherein the sum of a thickness of the photosensitive sensing unit and the thickness of the liquid crystal layer at the position corresponding to the first opening area is equal to a thickness of the liquid crystal layer at the position corresponding to the second opening area.

4. The fingerprint identification display panel according to claim 2, further comprising: a thickness adjustment layer located at the first opening area;
wherein the thickness adjustment layer is disposed between the photosensitive sensing unit and the array substrate;
wherein the sum of a thickness of the photosensitive sensing unit, a thickness of the thickness adjustment layer and a thickness of the liquid crystal layer at the position corresponding to the first opening area is equal to the thickness of the liquid crystal layer at the position corresponding to the second opening area.

5. The fingerprint identification display panel according to claim 4, wherein the thickness adjustment layer is a resin layer.

6. The fingerprint identification display panel according to claim 1, wherein a deflection state of liquid crystal molecules of the liquid crystal layer at the position corresponding to the first opening area satisfies the following formula:

$$(n_{eff}-n_o)d=\tfrac{1}{4}\lambda+n\lambda;$$

wherein $n_{eff}$ is a refractive index of deflected liquid crystal molecules for e-light with a polarization direction parallel to an optical axis of the deflected liquid crystal molecules, $n_o$ is a refractive index of the deflected liquid crystal molecules for o-light with a polarization direction perpendicular to the optical axis of the deflected liquid crystal molecules, d is a thickness of the liquid crystal layer at the position corresponding to the first opening area, n is a positive integer, and λ is a wavelength of light passing through the liquid crystal layer at the position corresponding to the first opening area.

7. The fingerprint identification display panel according to claim 6, further comprising: an electrode structure disposed at the first opening area for adjusting the deflection state of the liquid crystal molecules.

8. The fingerprint identification display panel according to claim 7, wherein the electrode structure further comprises: an upper electrode disposed on a side of the counter substrate facing the liquid crystal layer and a lower electrode disposed on a side of the array substrate facing the liquid crystal layer.

9. The fingerprint identification display panel according to claim 8, wherein the lower electrode is a fixed potential electrode connected with a photodiode in the photosensitive sensing unit.

10. A display device, comprising the fingerprint identification display panel according to claim 1.

11. The fingerprint identification display panel according to claim 2, further comprising: a thickness adjustment layer located at the first opening area;
wherein the thickness adjustment layer is disposed on a side of the photosensitive sensing unit facing the liquid crystal layer;
wherein the sum of a thickness of the photosensitive sensing unit, a thickness of the thickness adjustment layer and a thickness of the liquid crystal layer at the position corresponding to the first opening area is equal to the thickness of the liquid crystal layer at the position corresponding to the second opening area.

12. The fingerprint identification display panel according to claim 2, further comprising: a thickness adjustment layer located at the first opening area;
wherein the thickness adjustment layer is disposed on a side of the counter substrate facing the liquid crystal layer;
wherein the sum of a thickness of the photosensitive sensing unit, a thickness of the thickness adjustment layer and a thickness of the liquid crystal layer at the position corresponding to the first opening area is equal to the thickness of the liquid crystal layer at the position corresponding to the second opening area.

13. The display device according to claim 10, wherein a thickness of the liquid crystal layer at the position corresponding to the first opening area satisfies the following formula:

$$(n_e-n_o)d=\tfrac{1}{4}\lambda+n\lambda;$$

wherein $n_e$ is a refractive index of the liquid crystal molecules for e-light with a polarization direction parallel to an optical axis of the liquid crystal molecules, $n_o$ is a refractive index of the liquid crystal molecules for o-light with a polarization direction perpendicular to the optical axis of the liquid crystal molecules, d is a thickness of the liquid crystal layer at the position corresponding to the first opening area, n is a positive integer, and λ is a wavelength of light passing through the liquid crystal layer at the position corresponding to the first opening area.

14. The display device according to claim 13, wherein the sum of a thickness of the photosensitive sensing unit and the thickness of the liquid crystal layer at the position corresponding to the first opening area is equal to a thickness of the liquid crystal layer at the position corresponding to the second opening area.

15. The display device according to claim 13, further comprising: a thickness adjustment layer located at the first opening area;
wherein the thickness adjustment layer is disposed between the photosensitive sensing unit and the array substrate;
wherein the sum of a thickness of the photosensitive sensing unit, a thickness of the thickness adjustment layer and a thickness of the liquid crystal layer at the position corresponding to the first opening area is equal to the thickness of the liquid crystal layer at the position corresponding to the second opening area.

16. The display device according to claim 15, wherein the thickness adjustment layer is a resin layer.

17. The display device according to claim 10, wherein a deflection state of liquid crystal molecules of the liquid crystal layer at the position corresponding to the first opening area satisfies the following formula:

$$(n_{eff}-n_o)d = \tfrac{1}{4}\lambda + n\lambda;$$

wherein $n_{eff}$ is a refractive index of deflected liquid crystal molecules for e-light with a polarization direction parallel to an optical axis of the deflected liquid crystal molecules, $n_o$ is a refractive index of the deflected liquid crystal molecules for o-light with a polarization direction perpendicular to the optical axis of the deflected liquid crystal molecules, d is a thickness of the liquid crystal layer at the position corresponding to the first opening area, n is a positive integer, and $\lambda$ is a wavelength of light passing through the liquid crystal layer at the position corresponding to the first opening area.

18. The display device according to claim 17, further comprising: an electrode structure disposed at the first opening area for adjusting the deflection state of the liquid crystal molecules.

19. The display device according to claim 18, wherein the electrode structure further comprises: an upper electrode disposed on a side of the counter substrate facing the liquid crystal layer and a lower electrode disposed on a side of the array substrate facing the liquid crystal layer.

20. The display device according to claim 19, wherein the lower electrode is a fixed potential electrode connected with a photodiode in the photosensitive sensing unit.

* * * * *